United States Patent [19]

Hennig

[11] Patent Number: 4,616,266

[45] Date of Patent: Oct. 7, 1986

[54] METHOD AND APPARATUS FOR ELECTRICALLY CONTROLLABLE SCANNING DEVICE FOR MOIRE-FREE SCANNING OF RASTERED MASTERS

[75] Inventor: Eberhard Hennig, Ascheberg, Fed. Rep. of Germany

[73] Assignee: Dr. Ing. Rudolf Hell GmbH, Fed. Rep. of Germany

[21] Appl. No.: 538,275

[22] Filed: Oct. 3, 1983

[30] Foreign Application Priority Data

Oct. 9, 1982 [EP] European Pat. Off. ........ 82109373.9

[51] Int. Cl.$^4$ .......................... H04N 1/40; H04N 1/00
[52] U.S. Cl. ..................................... 358/280; 358/294; 382/65; 250/227; 350/96.24
[58] Field of Search ................ 358/280, 285, 293, 294, 358/901, 283, 284, 299, 300; 382/65, 66; 340/815.31; 250/227; 350/96.22, 96.24

[56] References Cited

U.S. PATENT DOCUMENTS

| | | |
|---|---|---|
| 2,691,696 | 10/1954 | Yule . |
| 3,225,329 | 12/1965 | Rabinon ................... 382/32 |
| 3,775,559 | 11/1972 | Vieri ..................... 358/294 |
| 3,991,318 | 9/1976 | Duguay . |
| 4,266,250 | 5/1981 | Heinzl ................... 358/293 |
| 4,311,357 | 1/1982 | Lang ..................... 350/6.9 |
| 4,403,258 | 9/1983 | Balzan et al. ........... 358/284 |
| 4,486,788 | 12/1984 | Yamada .................. 358/283 |

OTHER PUBLICATIONS

Optical Fibers for Scanning Digitizers, W. Pfert and G. C. Stocker, Bell System Technical Journal, vol. 60, 1981, Apr., No. 4, pp. 523-533.

Primary Examiner—James J. Groody
Assistant Examiner—John K. Peng
Attorney, Agent, or Firm—Hill, Van Santen, Steadman & Simpson

[57] ABSTRACT

Scanning apparatus and method for scanning rastered reproduction of differently rastered masters in reproduction technology using electronic means for selecting a shaped diaphragm which is variable in its geometry during scanning and wherein a center portion of the scanned picture can be added to different edge geometry scanning configurations so as to eliminate Moire effect.

12 Claims, 4 Drawing Figures

METHOD AND APPARATUS FOR ELECTRICALLY CONTROLLABLE SCANNING DEVICE FOR MOIRE-FREE SCANNING OF RASTERED MASTERS

BACKGROUND OF THE INVENTION

1. Field of the Invention

This invention relates in general to reproduction technology as, for example, in printing wherein masters are commonly scanned which are unrastered or rastered with different raster width and/or screen angles.

2. Description of the Prior Art

The use of rastered offset masters for rotogravure so-called "offset rotogravure conversion" called OTC is gaining increasingly popularity and significance. The principle advantage of this method is that rastered offset positives can be more quickly and cheaply produced and corrected than the previously utilized half-tone separations for rotogravure. Proofs can be produced economically from OTC. Since the conversion conditions from offset to rotogravure are known, the printed results in rotogravure can be optimized before the expensive rotogravure form is produced by means of electronic engraving, for instance.

It is known from German Patent application P No. 32 17 752 which teaches a method for moire-free scanning wherein a diaphragm matched in shape, size and angular position to the raster of the master is employed for scanning.

This method, however, has limits when as described, for example, in "Der Polygraph", No. 18, 1968, the engraving of the rotogravure form occurs by means of the "Helio-Klischograph" manufactured by Dr. Ing. Rudolf Hell GmbH or when scanning and re-recording occurs in rotating scanners or similar machines.

With such machines, a multitude of master montages of entire magazine pages are mounted on the scanning cylinder and a plurality are covered line-wise by scanning optics device during a scanning pass. It is entirely conceivable that masters to be scanned in common or even the individual images within one page are different in terms of raster widths and/or screen angle. Unrastered page montages or individual images can also occur.

The method disclosed in German Patent Application P No. 32 17 752 cannot operate successfully because a mechanical switch-over of diaphragm shapes and diaphragm angles for matching the respective master part to be scanned is much too slow.

Conditions which are somewhat similar exist in scanners. Offset positives would also be desirable as masters in scanner technique for the above-mentioned reasons of economic feasibility. Masters having different raster width and/or screen angle can also occur during one scanning pass. For example, different screen angles definitely always exist when the four color separations of one image are to be acquired in a single scanning by the so-called multi-color method and the masters are rastered offset color separations.

It is an object of the present invention to provide a method and apparatus which allows the electron-optical scanning of unrastered or rastered masters having different raster widths, raster configurations and/or screen angles during one scanning pass such that when the rasters are added during the reproduction process a moire will not occur with one of the master rasters during recording.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
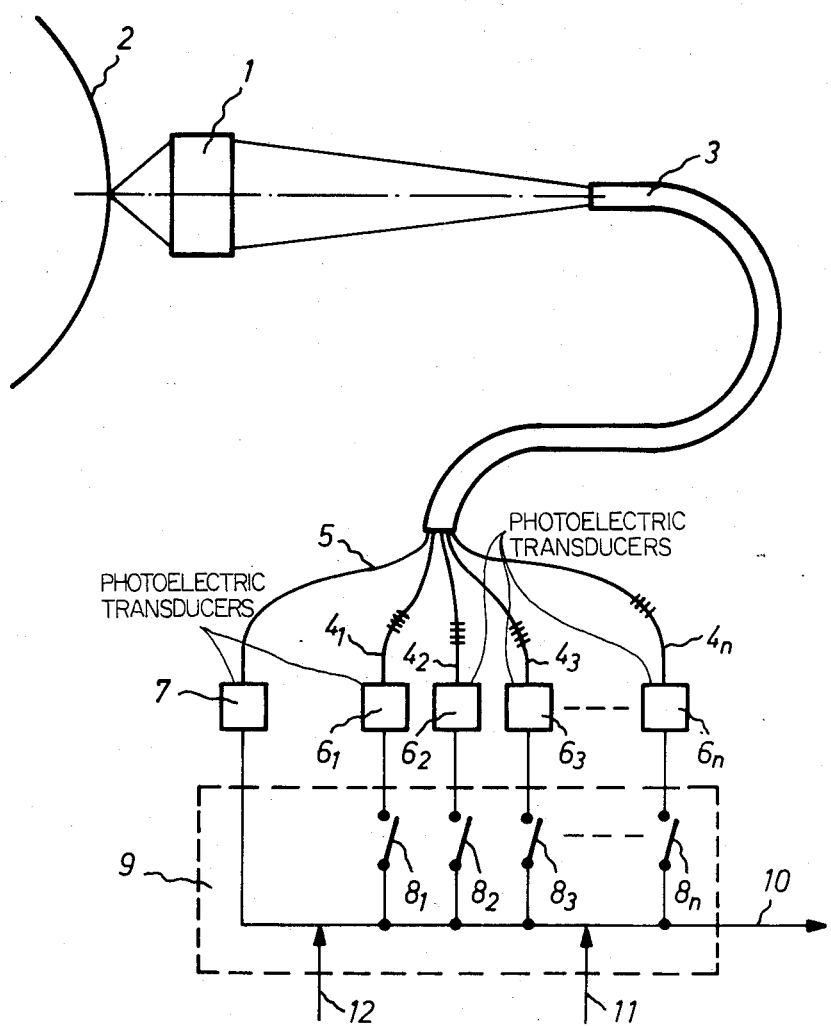
FIG. 1 is a block diagram illustrating the principles of the invention.
Figure 2:
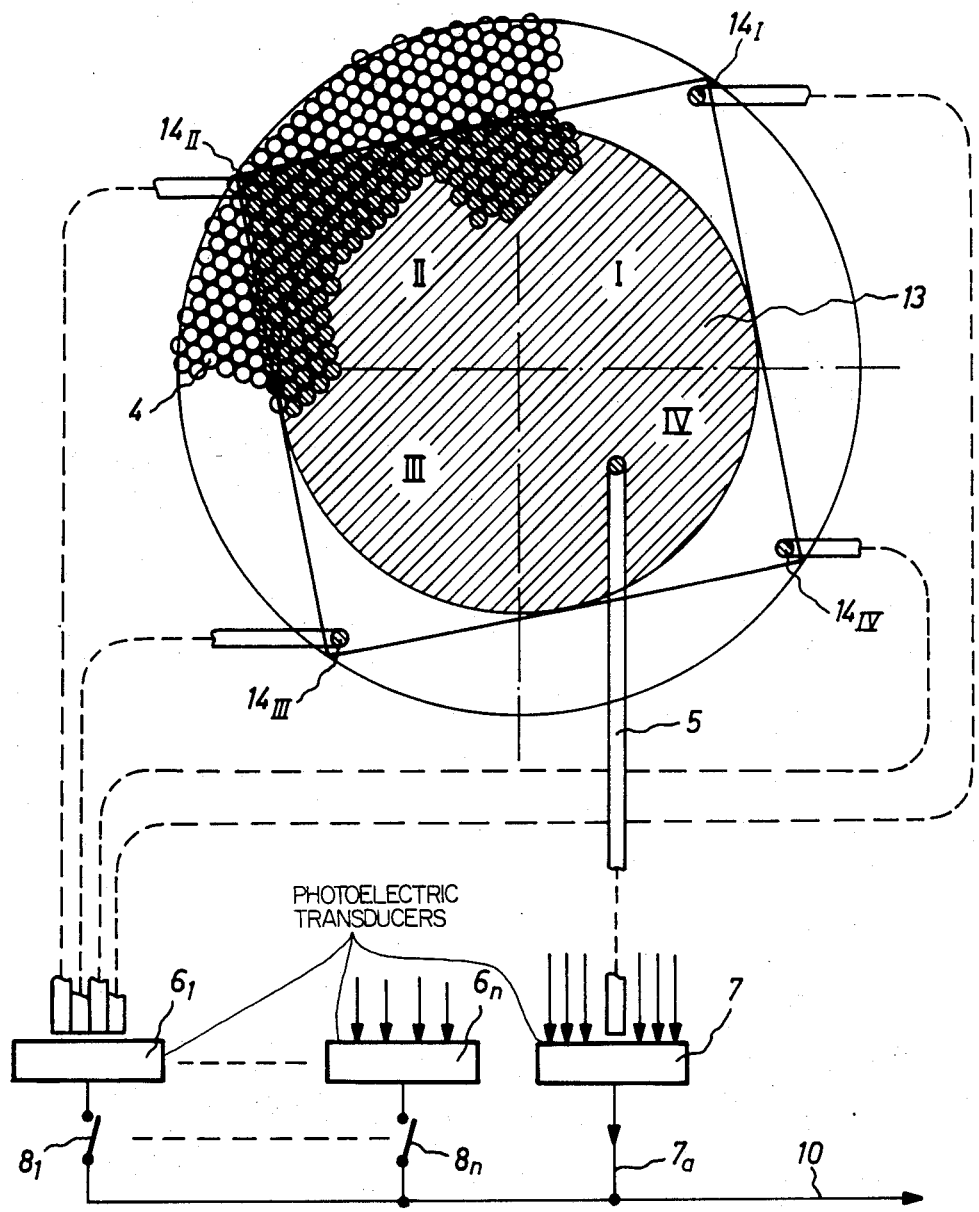
FIG. 2 is a schematic illustration illustrating the subdivision of the fiber optical waveguide bundle and the photo-electrical transducer.

FIG. 1 illustrates a master 2 mounted on a suitable drum which is driven by a suitable driving means not shown and which is scanned with a scanning optical device 1 which images a sub-image of the master and supplies it to one end of an arranged bundle 3 of fiber optical waveguides. The individual fiber diameters, the bundle diameter and the imaging scale are matched to each other. All of the fibers 5 of the bundle core 13 which is illustrated by shading in FIG. 2 have their opposite ends connected to a light receiver 7 which produces an output signal 7a which is supplied to an electrical summation point 10. In addition, to the fibers 5 of the bundle core 13 there are also a plurality of fringe fibers which surround the bundle core 13 and the second ends of the fringe fibers 4 are connected to various light receivers $6_1$ through $6_n$. The fringe fibers 4 are combined in a quadrant manner into quad groups $4_1$ through $4_n$. Each of the groups contains one fiber from each quadrant I through IV of the scanning end of the fibers and which are located within the respective quadrants at corresponding locations 14 as illustrated in FIG. 2, for example. Thus, for example, fiber $14_1$ is connected to light receiver $6_1$ as are fibers $14_{II}$, $14_{III}$ and $14_{IV}$ illustrated in FIG. 2. It is to be noted that each quad group thus contains one fiber from each quadrant I through IV of the opposite end of the fibers and these are located within the respective quadrant at corresponding locations 14. By utilizing a control unit 9, the output signals can be locked onto the image signal 10 by utilizing electronic switches $8_1$ through $8_n$ which are connected to the outputs of the light receivers $6_1$ through $6_n$. The switches $8_1$ through $8_n$ are illustrated as simple switches in FIG. 2. The geometry of the effective area of the scanning ends of the fiber bundle 3 can be varied by switching on or off specific light receivers 6 for the outer area.

When the fringe fibers 4 of the fiber bundle 3 are divided into the four quadrants I through IV and when the four corresponding individual fibers 14 of each quadrant are combined at a light receiver 6, then the number of required light receivers 6 and switches 8 is reduced by one-fourth for obtaining the same effect.

By varying the effective area of the fiber bundle an effect equivalent to the variation of the diaphragm such as disclosed in German Patent Application P No. 32 17

752 is obtained in terms of shape, size and angular position. With the present invention, however, the matching on the basis of the electronic switches 8 in the control unit 9 can be accomplished so quickly that it changes the diaphragm geometry and the angularity between master parts during a scanning event in a manner such as required by the next master part to be scanned. The control unit 9 which decides which individual fibers 4 must be activated for the respective master part receives its instruction over the line 12 and said instruction can be obtained, for example, by scanning an on-line control mask.

The desired geometry and angular position can also be manually input over line 11 by means of setting the corresponding switches $8_1$ through $8_n$.

For scanning non-rastered continuous-tone masters, the fringe fibers 4 can be advantageously interconnected to accomplish unsharp masking areas scan. The core 13 of the bundle acts as the principle diaphragm. As a result, electronic unsharp masking for contrast enhancement is possible such as described in U.S. Pat. No. 2,691,696.

The central core region 13 which is not switched of the fiber bundle can also consist of a single thick individual fiber or it can also be a directly illuminated photo-electrical transducer as, for example, a photodiode.

The complete fiber bundle can also be replaced with a correspondingly shaped array of photo-electrical transducers as, for example, diodes. This arrangement would also be in the shape illustrated in FIG. 2. The scanning optics 1 may be a zoom lens which matches the scanned image passage to the actual size of the array with the proper magnification scale.

Figure 3:
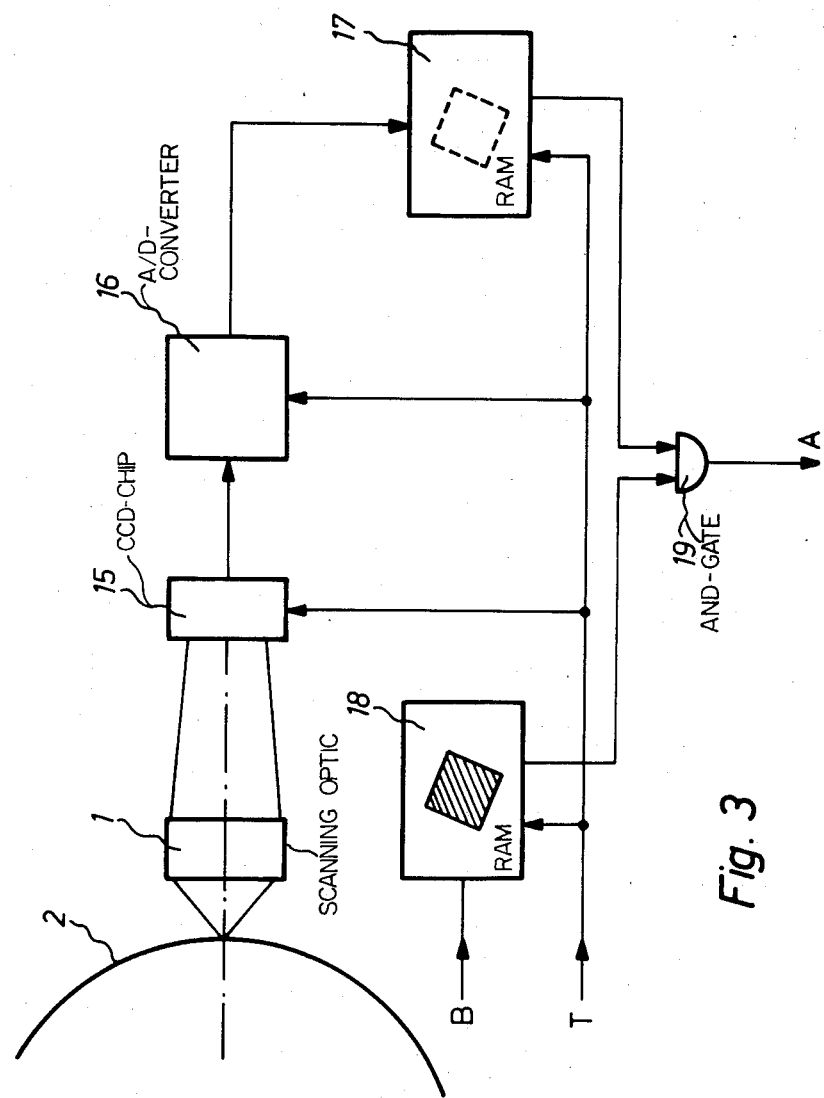
FIG. 3 is a block diagram illustrating the diaphragm selection using read-write memories.
Figure 4:
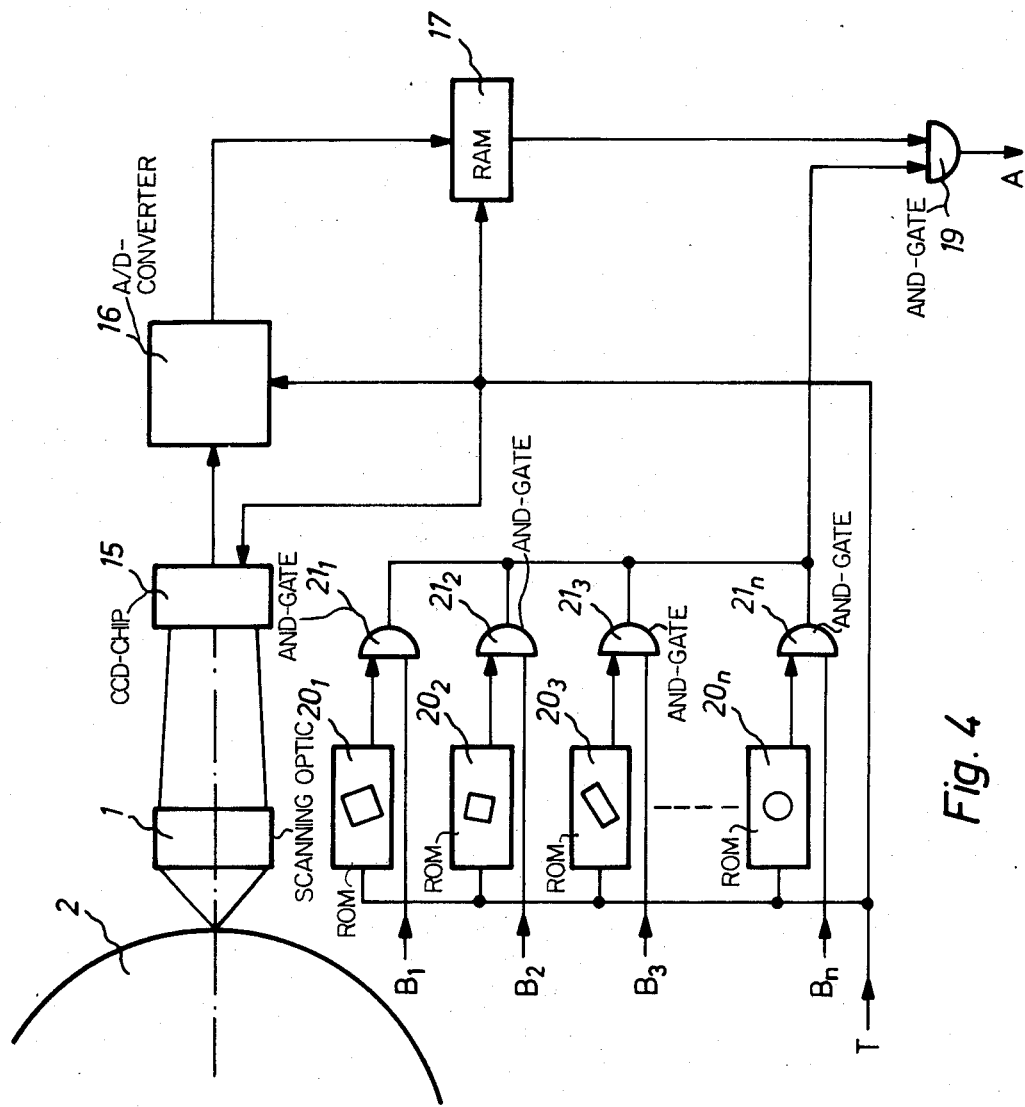
FIG. 4 is a block diagram illustrating the diaphragm selection by means of a plurality of read-only memories.

Illustrated in FIGS. 3 and 4 are matrix-like arrangements of photo-electric transducers having memory properties which serve as the light receiver, for example, such as the charge coupled device imager chip CCD 15. The target of such chips is formed from a plurality of semiconductor elements in a regular arrangement which store an image which is projected onto the chip as a charged carrier image and such structures are disclosed, for example, in "Markt Und Technik", No. 16, April 1982, pages 24 ff.

Given such charge coupled imager chips the charges stored in the individual image points are interrogated in a specific manner by a clock T and this sequence of analog luminance signals is read into a read-write memory 17 after being digitized in an analog-to-digital converter 16. The image originally projected onto the CCD chip can be intermediately stored in said read-write memory 17 as a charge carrier image. The selection of which of the image points are to be interpreted upon read-out and which are not to be interpreted can be determined by means of external wiring of the read-write memory. A specific part of the stored image portion can be electronically "blanked out" in this manner and a "diaphragm" can be formed of the respective requisite shape, size and angular position. This can occur as shown in FIG. 3 for example, by utilizing a second read-write memory 18 which has a bit pattern with a diaphragm shape, size and angular position which have been input therein and those image points of the part of the image which is presently stored in the read-write memory 17 can be interpreted. For purposes of illustration, a diaphragm shape is illustrated in FIG. 3 in the read-write memories 17 and 18. Read-in or, respectively, read-out of both read-write memories 17 and 18 as well as of the CCD chip 15 are controlled by a shared clock which produces a signal T illustrated in FIG. 3. The clock signal T can be advantageously generated by a clock generator not shown which is mounted on the same axis as the master cylinder upon which the master 2 is mounted of the scanner or, respectively, of the engraving machine. The coding of the diaphragm read-write memory 18 according to the objects given above, changes frequently during scanning and can be acquired by means of an on-line control mask or from a program memory synchronized with the rotation and can be supplied to the memory 18 over line B.

The output signals of the diaphragm memory 18 and of the image memory 17 are supplied to an AND gate 19 which emits an output signal only when both memories 17 and 18 emit a signal.

FIG. 4 illustrates a further modification of the device illustrated in FIG. 3 wherein a series of data memories $20_1$ through $20_n$ which have fast access are employed as the diaphragm memory and store various diaphragms shapes as illustrated in FIG. 4 which are stored in the different memories. Each of the memories $20_1$ through $20_n$ receives a clock signal T and supply outputs to AND gates $21_1$ through $21_n$ which receive control signal on lines $B_1$ through $B_n$ according to the particular requirements. The control signals on lines $B_1$ through $B_n$ cause the outputs of respective ones of the memories $20_1$ through $20_n$ to pass and be supplied to the AND gate 19. The control signal in the clock signal can be obtained from the same elements as utilized for the device illustrated in FIG. 3.

Although the invention has been described with respect to preferred embodiments, it is not to be so limited as changes and modifications may be made which are within the full intended scope of the invention as defined by the appended claims.

I claim as my invention:

1. A method for electro-optical scanning and moire-free-recording of unrastered or rastered masters having different raster geometry during one scanning pass, whereby a screening signal is added to the scanning signal before rerecording, comprising the steps of scanning a partial image respectively with a scanning optics, imaging on a surface consisting of a multitude of light receivers, the output of said scanning optics, selecting the output of only a specific plurality of the multitude of light receivers; masking-out is accomplished of the total active light receivers in that the geometrical contour has a specific geometrical relation to the raster configuration to be respectively scanned; and switching on and off the light receivers individually or in groups during scanning.

2. Apparatus for electro-optical scanning and moire-free recording of unrastered or rastered masters comprising a scanning optics means for scanning a master, a preferable circular-shaped bundle of a multitude of individual fiber optical waveguides, preferably an ordered fiber bundle receiving the output of said scanning optics means and the individual fibers of the bundle are conducted to a plurality of photo-electrical transducers; switching means connected to said photo-electrical transducers for switching them on and off in groupings during scanning and the geometrical contour of said groupings corresponding to the raster configuration which is to be scanned; and the outputs of all of said transducers switched in parallel.

3. Apparatus according to claim 2, characterized in that a plurality of read-only memories with fast access are provided, and data for a plurality of diaphragm shapes are stored therein, and in that the output of a plurality of read-write memories are recovered as selected by control lines as needed during scanning.

4. Apparatus according to claim 2, wherein the fibers of a preferably circular shaped bundle core are conducted to a shared one of said photo-electrical transducers; and such photo-electrical transducer is switched on permanently during the entire scanning.

5. Apparatus according to claim 4, characterized in that the bundle core consists of a single fiber-optical waveguide which has a diameter corresponding to the diameter of said bundle core.

6. Apparatus according to claim 2, characterized in that the outer ones of said fibers of said preferbly circular shaped fiber bundle which are not associated with the unswitched core area are combined by quadrants with corresponding fibers of the individual quadrants connected to a respective, shared photo-electrical transducer; and their outputs are switched in parallel to the output of the transducer for the bundle core.

7. Apparatus according to claim 6, characterized in that the respectively scanned partial image is imaged on a plurality of photo-electrical transducers whose geometrical arrangement corresponds to the arrangement of the individual fiber-optical waveguides at the input to the bundle.

8. Apparatus according to claim 7, characterized in that the geometrical arrangement of the photo-electrical transducers is similar to the geometrical arrangement of the fiber-optical waveguides at the input to the bundle; and in that the required imaging scale is adjustable by changing the scanning optics means.

9. Apparatus according to claim 8, characterized in that the scanning optics means is a zoom lens.

10. Apparatus for electro-optical scanning and moire-free recording of unrastered or rastered masters comprising, a scanning optics means for scanning a master, a central core light sensor comprising a sensor per se receiving the central portion of the output of said scanning optics means, a plurality of light pick-up means for the area surrounding said central portion and comprising optical waveguides, a plurality of remotely located sensors receiving the output of said optical waveguides and switching means connected to said plurality of sensors for switching them off and on during scanning and the outputs of all said sensors switched in parallel.

11. Apparatus for electro-optical scanning and moire-free recording of unrastered or rastered masters comprising a scanning optic means for scanning a master, a matrix-like arrangement of photo-electrical transducers having memory properties, an analog-digital converter for digitizing the output signals of said matrix-like arrangement of photo-electrical transducers, said digitized signals are stored in a first read-write memory and means provided which during read-out of the read-write memory by means of a shared clock allows only values out of specific memory cells, whose geometrical arrangement in a stored charge character image in said matrix-like arrangement of photoelectrical transducers having memory properties corresponds to the shape of a desired diaphragm.

12. Apparatus according to claim 11, characterized in that the selection of the memory cells of said first read-write memory to be read out is accomplished by means of a second read-write memory, and its coding is changeable with a control line during scanning, and the outputs of said first and second read-write memories are connected to respective inputs of an AND gate; and a read-write clock signal supplied from a clock generator to the image receivers, the analog-to-digital converter, and said first and second read-write memories.

* * * * *